United States Patent

Hammock

(10) Patent No.: US 9,327,642 B2
(45) Date of Patent: May 3, 2016

(54) DECELERATION-TRIGGERED LED STOP LAMP

(71) Applicant: Jeffery B. Hammock, Madison, AL (US)

(72) Inventor: Jeffery B. Hammock, Madison, AL (US)

(73) Assignee: MechOptix, Inc., Madison, AL (US)

( * ) Notice: Subject to any disclaimer, the term of this patent is extended or adjusted under 35 U.S.C. 154(b) by 154 days.

(21) Appl. No.: 13/776,325

(22) Filed: Feb. 25, 2013

(65) Prior Publication Data

US 2014/0239807 A1 Aug. 28, 2014

(51) Int. Cl.
*B60Q 1/44* (2006.01)

(52) U.S. Cl.
CPC .................................... *B60Q 1/445* (2013.01)

(58) Field of Classification Search
USPC ......... 315/76, 77, 79; 340/464, 467, 478, 479
See application file for complete search history.

(56) References Cited

U.S. PATENT DOCUMENTS

| 6,417,767 | B1 | 7/2002 | Carlson et al. |
| 8,482,397 | B1 | 7/2013 | Tajiri |
| 2005/0237172 | A1* | 10/2005 | Boomershine, III .......... 340/467 |
| 2006/0273891 | A1* | 12/2006 | Quach et al. .................. 340/467 |
| 2013/0141231 | A1 | 6/2013 | Aberizk |
| 2013/0222129 | A1* | 8/2013 | Hirose .......................... 340/479 |
| 2014/0142808 | A1* | 5/2014 | Hirade et al. .................. 701/36 |

FOREIGN PATENT DOCUMENTS

| EP | 0957000 A2 | 11/1999 |
| WO | WO0142045 A1 | 6/2001 |

* cited by examiner

*Primary Examiner* — Thai Pham
(74) *Attorney, Agent, or Firm* — George P Kobler

(57) ABSTRACT

A deceleration-triggered stop lamp installable into for vehicles includes a support frame to which is mounted: a plurality of LEDs; a deceleration sensor; microcontroller; an energy storage component; and power circuitry configured to detect when the vehicle brake pedal has been depressed and to divert power from the vehicles power system to charge the energy storage component. In the event the vehicle decelerates at a rate greater than a predefined threshold, the power circuitry is configured to illuminate the LEDs with power from the energy storage component.

2 Claims, 4 Drawing Sheets

US 9,327,642 B2

DECELERATION-TRIGGERED LED STOP LAMP

BRIEF DESCRIPTION OF THE DRAWINGS

A deceleration-triggered LED stop lamp is described with reference to the accompanying drawings. Additionally, the left-most digit(s) of a reference number identifies the drawing in which the reference number first appears.

DETAILED DESCRIPTION

The various embodiments and their advantages are best understood by referring to FIGS. 1 through 6 of the drawings. The elements of the drawings are not necessarily to scale, emphasis instead being placed upon clearly illustrating the principles of the apparatus. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment of the apparatus claimed below. Thus, the appearance of the phrases "in one embodiment," "in another embodiment," or variations thereof in various places throughout the specification are not necessarily all referring to its respective embodiment.

Figure 1:
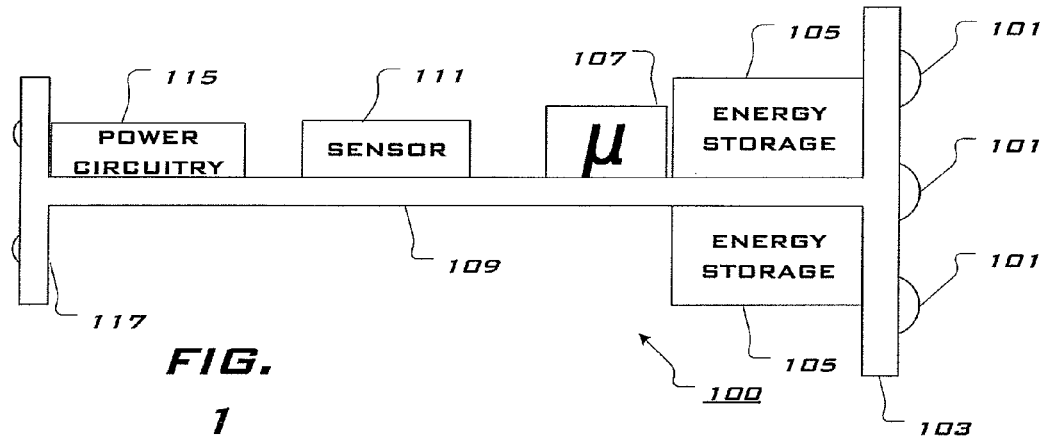
FIG. 1 illustrates an exemplary functional structure of a stop lamp according to the teachings herein.

With reference first to FIG. 1, a general structure of an exemplary stop lamp 100 is illustrated having a support frame 103, comprising a circuit board 109 on which is mounted a plurality of Light-emitting diodes (LEDs) 101. The stop lamp 100 further comprises one or more energy storage components 105 suitable for storing energy to provide power to illuminate the LEDs 101, a microcontroller 107, a deceleration sensor 111, and power circuitry 115 adapted for receiving power from a conventional vehicle 12V DC system, and converting for use in the stop lamp 100 as will be discussed in greater detail below. The stop lamp 100 also comprises a base 117, suitable for installation into any standard vehicle stop lamp socket and having contacts for coupling power from the vehicle's power system to the power circuitry 115. Examples of current stop lamp standards may be found in model numbers 1156, 1157, 3156, and 3157. However, it will be understood that the base may be any suitable structure that may currently exist or may be later developed that permits such installation. The stop lamp 100 preferably is configured with a diameter between about 1 inch to about 1 5/16 inch and should be able to meet applicable regulatory standards for operating and storage temperature, mechanical composition and electromagnetic interference. It will therefore be appreciated by those skilled in the arts that this stop lamp 100 is structured as an after-market replacement for manufacturer installed stop lamps, with self-contained illumination power that is charged from the vehicle's power system. Furthermore, the term, "vehicle" is intended to mean any vehicle with a power system which may be used to illuminate a lamp to indicate braking or deceleration, including, without limitation, cars, trucks, motorcycles, and trailers.

Figure 4:
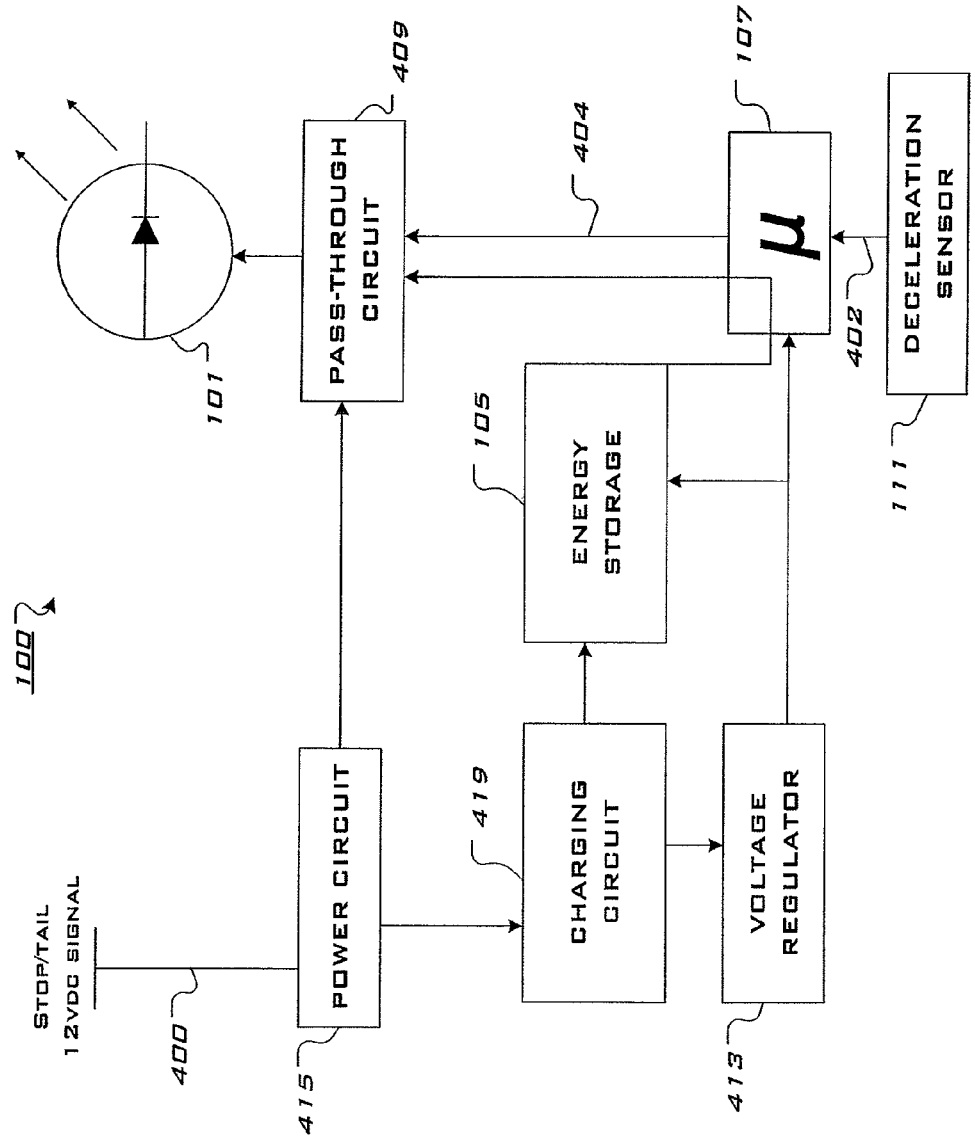
FIG. 4 is a functional diagram of the stop lamp of FIG. 1.

FIG. 4 presents a functional diagram of the exemplary stop lamp 100 comprising a power circuit 415 for receiving energy 400 from the vehicle power system and down-converting the voltage for use with the LEDs and the microcontroller 107, for example, the power circuit 415 in one embodiment may be adapted to down-convert 12VDC to about 5VDC. The power circuit 415 provides down-converted power to a charging circuit 419 and to a pass-through circuit 409. The charging circuit 419, in turn provides power to both the energy storage component(s) 105 and to a voltage regulator 413, which converts 5VDC power to about 3VDC for use with the microcontroller 107 and the deceleration sensor 111. The charging circuit 419 is preferably configured to divert the 5VDC to energy storage component(s) 105 when the vehicle brake pedal is depressed. The sensor 111 has an output 402 coupled to an input of the microcontroller 107. The output 402 is a signal which represents an acceleration (or deceleration) measured value. The microcontroller 107 is configured with control logic that upon receipt of a sensor signal 402 from the sensor 111 compares the measured acceleration value to a pre-programmed threshold defined to indicate whether the vehicle is decelerating at sufficiently high rate to initiate energizing the LEDs 101, and warn other drivers. If the measured acceleration value is determined to be greater than the pre-programmed threshold, control logic within the microcontroller 107 executes and a command signal 404 is issued as output from the microcontroller 107 to the pass-through circuit 409.

Figure 5:
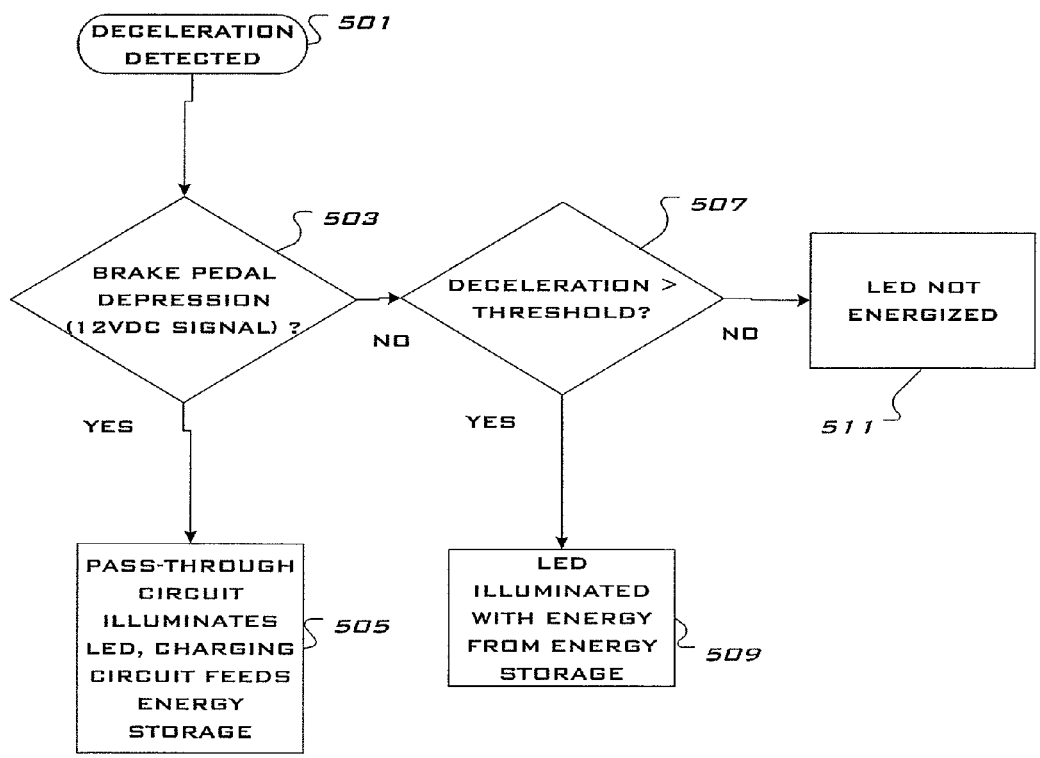
FIG. 5 is a flow diagram of the process performed by the stop lamp of FIG. 1.

FIG. 5 is a flow diagram of exemplary logic executed in an embodiment of the stop lamp 100. A deceleration signal 402 is received by the microcontroller 107 at 501. A determination is made at 503 whether the brake pedal has been depressed by detecting the presence of a 12 Volt signal to the power circuit 415 where the signal is down-converted for illumination of the LEDs. If yes, the logic circuit comprised with the pass-through circuit 409 provides illumination energy from the vehicle's power system to illuminate the LEDs 101, in the same manner as a conventional brake lamp, at step 505. If 12 Volt power from depression of the brake pedal is not present, in step 507 the microcontroller 107 compares the measured deceleration signal 402 to the pre-defined threshold. If the value represented by the deceleration signal 402 is above the pre-defined threshold (step 509) the LEDs 101 are illuminated with energy from the energy storage components 105. On the other hand, if the threshold is not met or exceeded 511 the LEDs are not illuminated. It will be understood that the steps of this exemplary process are not limited to the order described herein.

Figure 2:
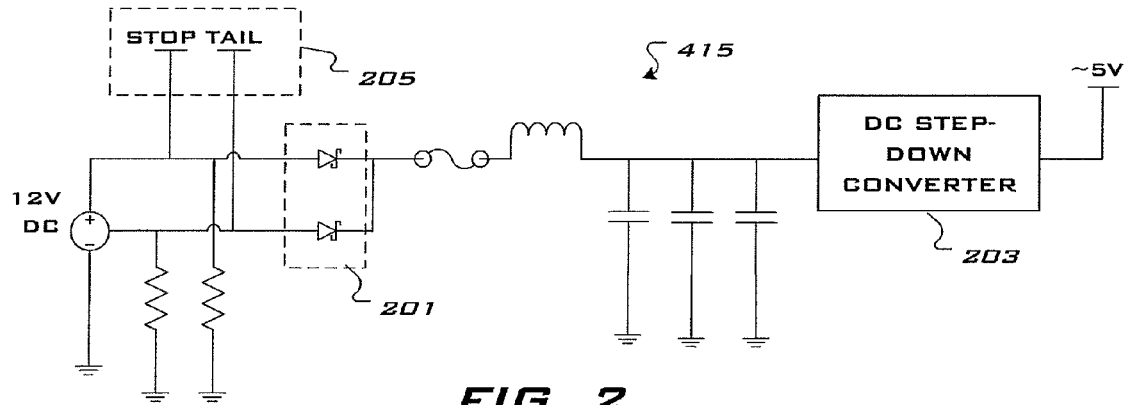
FIG. 2 is a schematic of an exemplary power circuit for the stop lamp of FIG. 1.
Figure 3:
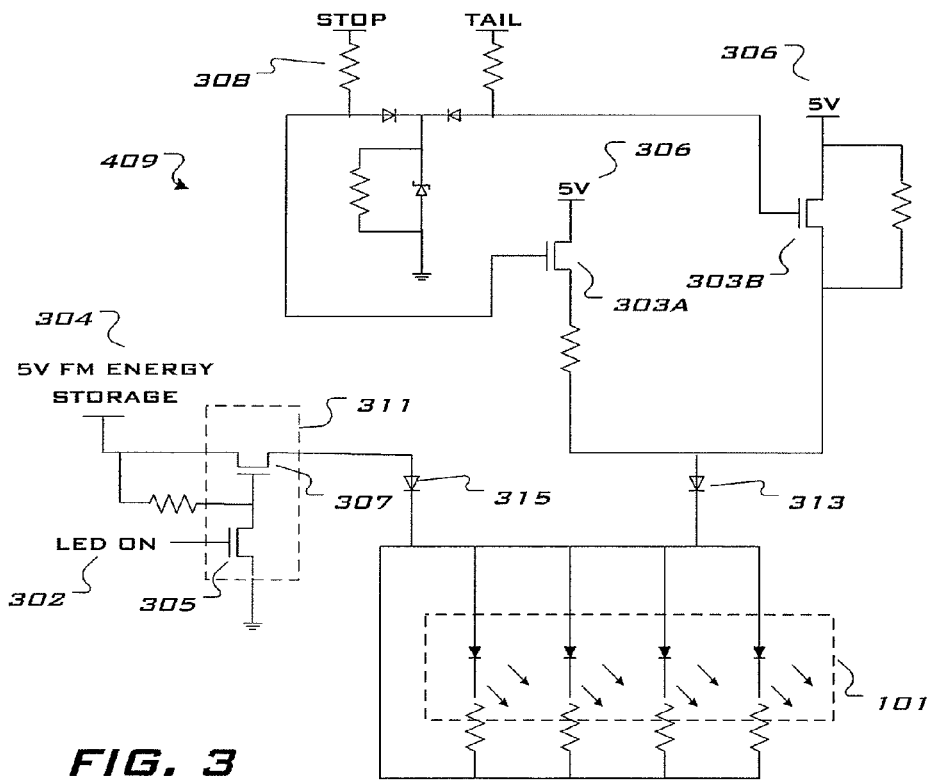
FIG. 3 is a schematic of an exemplary pass-through circuit for the stop lamp of FIG. 1.

FIGS. 2, 3 depict exemplary circuitry for a power circuit 415 and a pass-through circuit 409. The power circuit 415 receives 12VDC power from the vehicle's power system 207 upon initiation of braking by the driver and commands to illuminate the stop and tail lights 205. The 12V power is preferably rectified, e.g., with a Schottky barrier rectifier, 201, and then down-converted from 12 VDC to about 5 VDC with a step-down converter 203, which may be, in one embodiment, a buck regulator.

The pass-through circuit 409 comprises a logic circuit which may be implemented with switches 303, 305, 307, e.g., transistors, and particularly, field-effect transistors (FETs). As described above, depression of the brake pedal initiates a 12 VDC signal which is down converted to about 5 VDC. A first logic circuit determines whether the brake pedal has been depressed when a voltage signal generated by activation of the pedal 308 is coupled to the respective gates of the switches 303A, 303B which triggers application of 5 VDC 306 power from the power circuit 415 to the circuit. Once cut-in voltage of diode 313 is achieved, power is applied to the LEDs 101. Thus, this first logic circuit applies current to the LEDs in the event the vehicle's brake pedal is depressed.

At the same time, energy 304 from the storage components 105 is applied to the pass-through circuit 409 through a rate-controlled load distributor 311 which may comprise first and second switches 305, 307. Also, control logic stored within the microcontroller causes the microcontroller 107 to output a command signal 302 to illuminate the LEDs 101, such command signal is coupled to the gate of switch 305 in the load distributor 311 while stored energy 304 is coupled to the gate of switch 307. In the event switches 305, 307 activate, current is applied to diode 315 which is selected to have a cut-in voltage high enough such that current from the load distributor 311 is suppressed unless no current is applied from the first logic circuit. Thus, when no current is presented from depression of the brake pedal, current 304 from the energy storage component(s) 105 is applied to the LEDs 101.

The microcontroller 107, as will be appreciated by those skilled in the arts, may be one or more computer-based processors. Such a processor may be implemented by a field programmable gated array (FPGA), application specific integrated chip (ASIC), programmable circuit board (PCB), multiple chip modules (MCMs), or other suitable integrated chip (IC) device.

Figure 6:
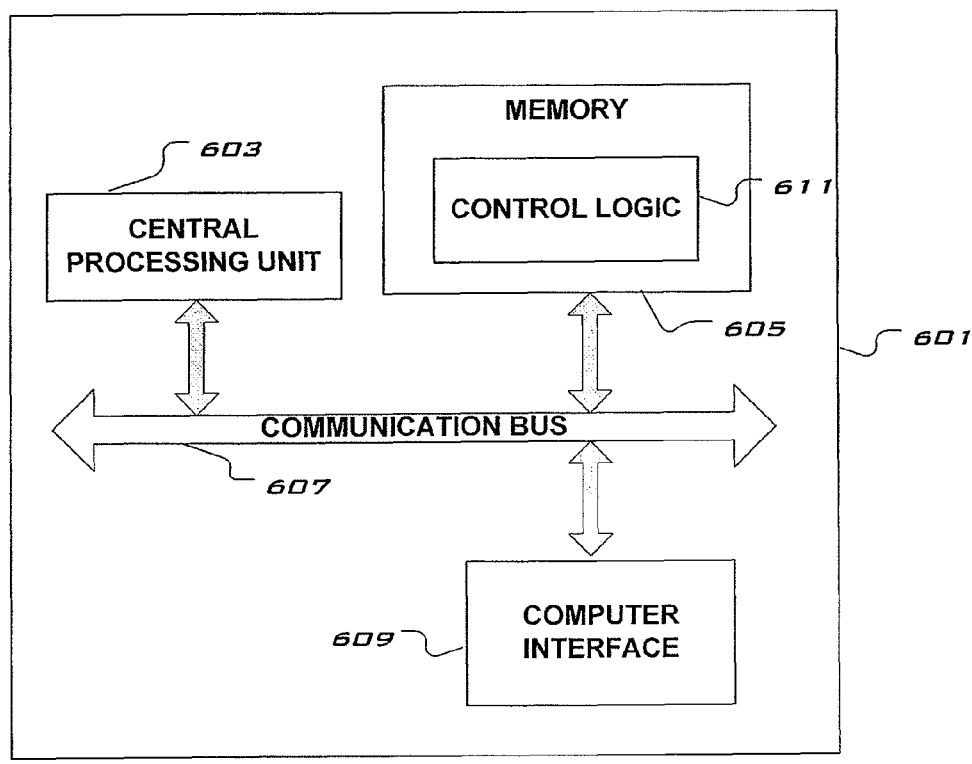
FIG. 6 is an exemplary processor for use in the stop lamp of FIG. 1.

With reference to FIG. 6, a processor 601 in effect comprises a computer system. Such a computer system includes, for example, one or more central processing units (CPUs) 603 that are connected to a communication bus 605. The computer system can also include memory 607, for example, a main memory, such as, without limitation, flash memory, read-only memory (ROM), or random access memory (RAM), and a secondary memory. The secondary memory can include, for example, a hard disk drive and/or a removable storage drive. The removable storage drive reads from and/or writes to a removable storage unit in a well-known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing control logic or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system. Also coupled to the communication bus 605 is a computer interface 609 for allowing external configuration of the memory and installation of control logic.

Control logic (i.e., computer programs) 611 are stored in the main memory and/or secondary memory. Control logic can also be received via the communications bus 605 from the computer interface 609 or from the memory 607. Such control logic 611, when executed, enables the computer system to perform certain features of the present invention as discussed herein. In particular, the control logic, when executed, enables a processor 601 to perform and/or cause the performance of features of the present invention. Accordingly, such control logic represent controllers of the computer system.

Control logic 611 or other substrate configuration representing data and instructions, which cause the processor to operate in a specific and predefined manner as, described hereinabove. The control logic 611 may advantageously be implemented as one or more modules. The modules may advantageously be configured to reside on the processor memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like. Control logic may be installed on the memory using a computer interface couple to the communication bus which may be any suitable input/output device. The computer interface may also be configured to allow a user to vary the control logic, either according to pre-configured variations or customizably.

As described above and shown in the associated drawings, the present invention comprises a vehicle deceleration-triggered stop lamp. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the described apparatus.

What is claimed is:

1. A deceleration-triggered stop lamp for vehicles comprising;
   a support frame having a base, stud base installable within a stop lamp socket of a vehicle and having an electrical contact coupled with a vehicle electrical power system when said base is installed within said stop lamp socket;
   a plurality of LEDs mounted to said support frame;
   a deceleration sensor mounted to said support frame and having an output representing a measured deceleration value;
   a computer-based controller mounted to said support frame having an input coupled to said output and configured with control logic compare said measured deceleration value to a pre-defined threshold and to issue a signal to illuminate said plurality of LEDs in the event said measured deceleration value is greater than or equal to said threshold;
   an energy storage component mounted to said support frame and coupled to said LEDs for providing energy thereto; and
   a charging circuit mounted to said support frame and coupled to said energy storage component and configured for conveying power diverted from said electrical contact in said base to said energy storage component; and
   wherein said stop lamp is configured to inhibit said energy storage component from illuminating said LEDs in the event a vehicle brake pedal is depressed.

2. The deceleration-triggered stop lamp of claim 1, wherein said charging circuit is configured to charge said energy storage component in the event the vehicle brake pedal is depressed.

* * * * *